Jan. 15, 1929.
A. DE CONINCK
1,698,781
BRAKING SYSTEM
Original Filed Jan. 10, 1920
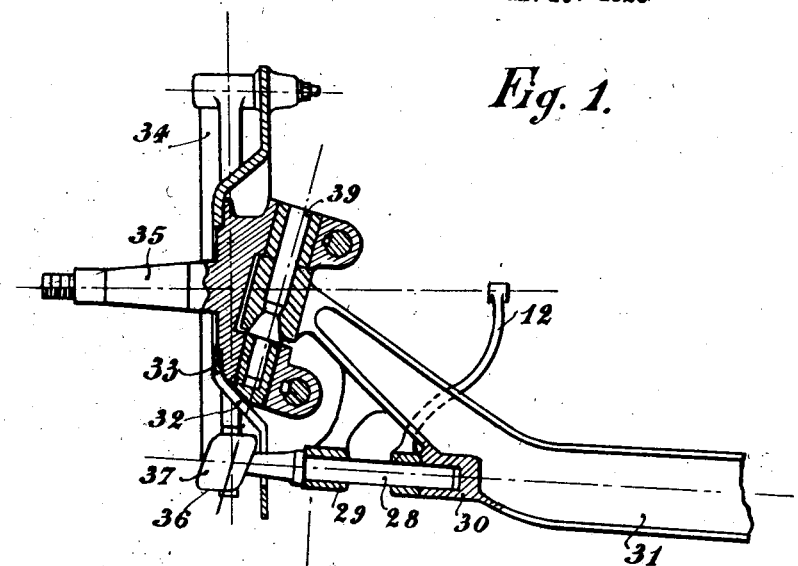
Fig. 1.
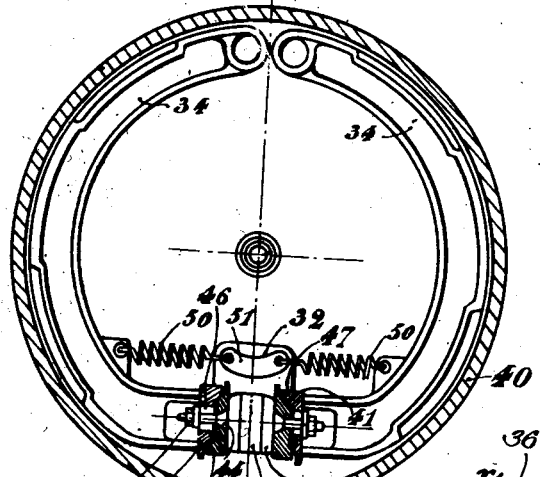
Fig. 2.
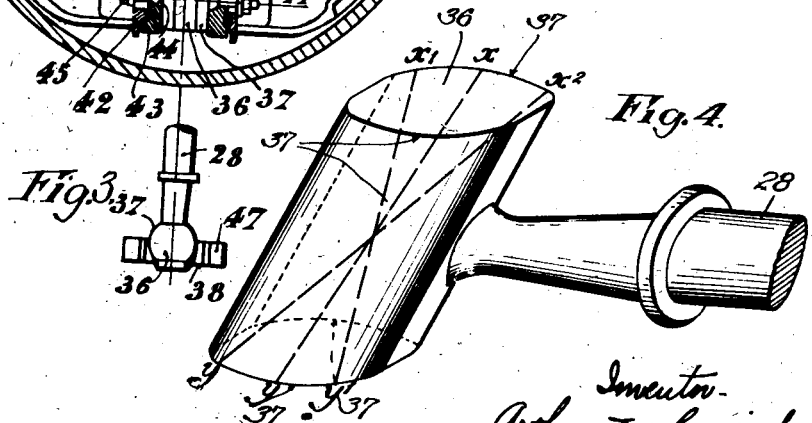
Fig. 3.
Fig. 4.
Inventor-
Arthur De Coninck,
By B. Singer
Atty Patented Jan. 15, 1929.

1,698,781

UNITED STATES PATENT OFFICE.

ARTHUR DE CONINCK, OF BRUSSELS, BELGIUM.

BRAKING SYSTEM.

Original application filed January 10, 1920, Serial No. 388,055, and in Germany October 21, 1918. Divided and this application filed December 12, 1921. Serial No. 521,878.

This invention relates to improvements in automobile brakes, and especially with reference to the provision of wear take-up devices of improved construction, applicable to brakes, for the purpose of taking up or compensating for the wear of the segments, as hereinafter shown and described.

The present invention is a division of my copending application for Letters Patent of the United States, for improvements in braking systems, filed June 10, 1920, Serial No. 388,055, which has matured into a Patent, No. 1,412,104, April 11, 1922.

The steering wheels of automobiles are braked by means of pivotally supported semicircular rings which are forced by some spreading device against the brake drum. The two brake shoes being drawn towards each other by springs, it is essential that the braking effect will cease as soon as the effect of the spreading device ceases. There are already in existence spreading devices comprising a cylinder with semicircular or ovoid body which is turned in order to spread the two brake jaws or to release them.

According to the present invention the braking element is constructed as a cylinder which is limited by two parallel surfaces. The edges of the cylinder act upon the brake shoes and owing to this arrangement the advantage is attained even upon a slight turning movement of the spreading element—that a very intensive braking effect is attained. The advantage, furthermore, is that in accordance with the construction of the end surface of the cylinders the two wheels are subjected to a braking force upon traveling through a curve, which braking force is varied uniformly for both wheels, and owing to this arrangement dangers are eliminated when traveling around a curve.

The spreading element for the brake shoes having parallel side surfaces which are also parallel to the axis of rotation causes the braking effect to decrease automatically while traveling through a curve. If the two parallel surfaces are disposed at an angle to the pivotal axis of the spreading element, then the braking effect for the inner and the outer wheel is not the same when traveling through a curve. The conditions may be selected so that the inner wheel is braked with a greater force than the outer wheel and this will increase the safety factor particularly against tipping or tilting while traveling around a curve.

One embodiment of the invention is shown in the drawing:

Fig. 1 shows a section through the pivot and also illustrates the spreading element;

Fig. 2 is a section through the brake drum showing the brake shoes;

Fig. 3 shows a view of the spreading element from the top;

Fig. 4 is a perspective view of the brake element acting on the brake shoes.

The brake drum 40 is firmly connected with the wheel of the vehicle. The wheel itself rests on the shaft 35, the supporting part of which can be turned about the shaft 39. The casing for this axle or shaft is connected with the front axle 31. The brake lever 12 is fixed to a shaft 28 rotatably supported in bearings 29, 30 and provided with the spreading element or cam 36, 37. The shaft 28 is not perpendicular to the pivot axis 39 nor is the cam 36 perpendicular to the shaft 28, but is inclined to said shaft. The pivot 39 of the journal is so inclined that if its axis were prolonged the same would pass to the point of contact of the wheel with the ground and at the same time it meets the horizontal axis of the inclined cam 36 at the center of the latter, as shown in Figure 1, that is to say, the spreading element or cam is coaxially inclined with said pivot 39 in order that the journal and its plate 33 may be able to rotate about such axis without affecting the free ends of the brake jaws 34 when said cam is in the position shown in said figure. This spreading element passes through an opening 32 of the plate 33 and rests between the brake shoes 43 which are mounted on the jaws 34. The jaws are permanently contracted by springs and are permanently expanded by the cylindrical spreading elements 36, 37. Depending upon the position of the parallel end surfaces of the cylinder with respect to the axis of rotation of the spreading elements various effects may be attained.

Fig. 4 for instance, shows that the distance $x\ y$ is larger than the distance $x'\ y'$ but less than $x^2\ y^2$. Here the parallel end surfaces of the cylinder are perpendicular to the pivotal axis 39. Upon traveling around a curve the braking effect upon equal rotation of the rod 28 automatically decreases on both wheels.

If the parallel surfaces of the cylinder 37, however, are not parallel to the axis but are inclined at a certain angle to the same, then upon braking the vehicle the two brakes will be applied to a different degree owing to the different braking effect of the cylinder edges.

Having thus described my invention, I claim:

1. In a braking system for the steering wheels of automobiles, a brake drum having brake shoes provided on the interior of said drum, a horizontal braking shaft, an inclined cam fast with the said shaft between the free ends of the shoes and acting in direct contact with said ends in order to remove them from one another, said cam having a lateral surface which comprises cylindrical opposite parts and having plane and horizontal end surfaces.

2. A front wheel braking system for automobile vehicles comprising, in combination, an axle having a pivotally mounted wheel journal the pivot axis of which is inclined, a plate fixed on said journal, brake jaws pivotally mounted on said plate for arrangement in a brake drum, a spring active to disengage said jaws from the drum, a braking shaft mounted for rotation in bearings on said axle and passing through an opening in said plate, a spreading cam element fast with said braking shaft and coaxially inclined with the aforesaid pivot and inclined with respect to the axis of said braking shaft, said spreading cam having a lateral surface comprising opposite substantially cylindrical cheeks between the ends of said brake jaws, said spreading cam having plane and horizontal end surfaces.

In witness whereof I affix my signature.

ARTHUR DE CONINCK.